UNITED STATES PATENT OFFICE.

FREDERICK RANSOME, OF LONDON, ENGLAND.

IMPROVEMENT IN THE MANUFACTURE OF ARTIFICIAL STONE.

Specification forming part of Letters Patent No. 133,888, dated December 10, 1872.

*To all whom it may concern:*

Be it known that I, FREDERICK RANSOME, of No. 2, Queen street Place, Cannon street, in the city of London, England, a subject of the Queen of Great Britain, have invented or discovered new and useful Improvements in the Manufacture of Artificial Stone; and I, the said FREDERICK RANSOME, do hereby declare the nature of the said invention, and in what manner the same is to be performed, to be particularly described and ascertained in and by the following statement thereof; that is to say—

The object of my present invention is to improve the manufacture of artificial stone, which will harden without the subsequent application of a solution of a soluble salt of an alkaline earth. For this purpose I combine finely-divided silica in a soluble state, obtained either artificially or naturally, with a solution of silicate of soda or potash, or of a mixture of such silicates, lime, clay, sand, chalk, or other material. The object of putting the finely-divided silica in a soluble state into the compound is, that it may combine with the caustic soda or potash set free by the action of the lime (or other substance capable of rendering such soda or potash caustic) on the silicate solution. The lime employed may be in the state of quicklime, or it may be hydrated, or partially hydrated, or substances containing lime, such as Portland or other hydraulic cements or limes, or other substances capable of acting in like manner to lime, upon the solution of soluble silica, may be employed in place of lime.

The substances to be combined, as well as the proportions thereof, may be varied very considerably, according to the object desired to be obtained; but for ordinary building-stones I find the following combination suitable, viz.: Six parts, by measure, of sand; two parts, by measure, of powdered chalk; one part, by measure, of powdered soluble silica; one part, by measure, of lime or Portland cement; one part, by measure, of solution silicate soda. Specific gravity, 1.700.

I prefer to mix or grind together the lime or Portland cement and soluble silica first, to which I then add the sand and chalk, and when the above are thoroughly mixed together in the dry state, I add the solution of silicate of soda, when the whole are incorporated together in a suitable mixing-mill. Sometimes I find it desirable to add a small quantity of water to increase the plasticity of the compound, which should be pressed into the molds or forms as soon as possible, and allowed to set or harden gradually by the action of the atmosphere.

I am aware of the previous patents of Ransome, October 3, 1865, and June 12, 1866, and do not desire to cover in this application anything covered thereby; but

What I claim is—

The manufacture of artificial stone by combining sand, soluble silica, lime, or such like material and silicate of soda, substantially as described.

FREDK. RANSOME.

Witnesses:
 WILMER M. HARRIS,
 THOS. BROWN.
 *Both of No. 17 Gracechurch street, London.*